United States Patent [19]
Millar

[11] 3,724,274
[45] Apr. 3, 1973

[54] PHYSIOLOGICAL PRESSURE TRANSDUCERS

[75] Inventor: Huntley D. Millar, Houston, Tex.
[73] Assignee: Millar Instruments, Inc., Houston, Tex.
[22] Filed: Feb. 11, 1971
[21] Appl. No.: 114,610

[52] U.S. Cl. ............. 73/398 AR, 128/2.05 D, 338/4
[51] Int. Cl. ........................... G01l 9/02, A61b 5/02
[58] Field of Search ..338/4; 73/398 AR; 128/2.05 D, 128/2.05 E

[56] References Cited

UNITED STATES PATENTS

| | | | |
|---|---|---|---|
| 3,461,416 | 8/1969 | Kaufman | 73/398 AR X |
| 3,258,971 | 7/1966 | Padgett | 73/398 AR |
| 3,477,295 | 11/1969 | Sumpter | 73/398 AR |
| 3,490,441 | 1/1970 | Curtis | 128/2.05 D |
| 3,553,625 | 1/1971 | Stedman | 338/4 |
| 2,420,148 | 5/1947 | Ostergren | 73/398 AR |

FOREIGN PATENTS OR APPLICATIONS 260,230   11/1970   U.S.S.R. .................. 73/398 AR

Primary Examiner—Louis R. Prince
Assistant Examiner—Frederick Shoon
Attorney—Arnold, White & Durkee

[57] ABSTRACT

A unique pressure transducer is disclosed which has particular application in making physiological measurements such as intra-arterial or intra-venous blood pressure measurements. The transducer employs the principle of a cantilever beam which is exposed directly to the source of pressure. The pressure applied to the cantilever beam causes flexure which is measured by a strain gauge, or other means for measuring its deformation, and a related electrical signal is produced.

23 Claims, 13 Drawing Figures

PATENTED APR 3 1973 3,724,274

Huntly D. Millar
INVENTOR

BY
Arnold, White & Durkee
ATTORNEYS

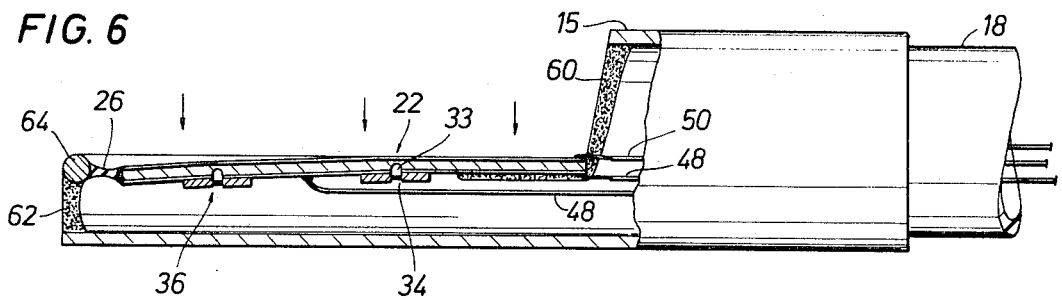
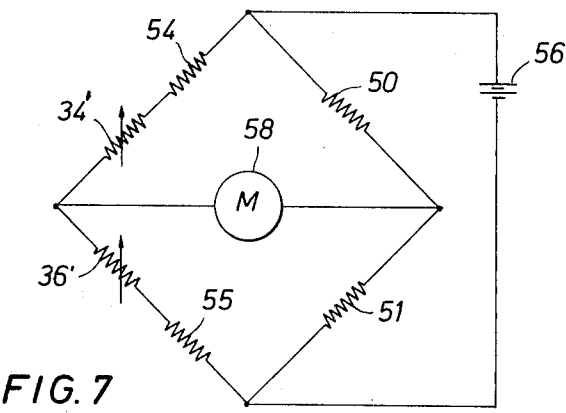
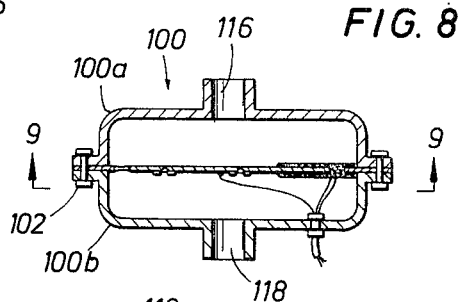
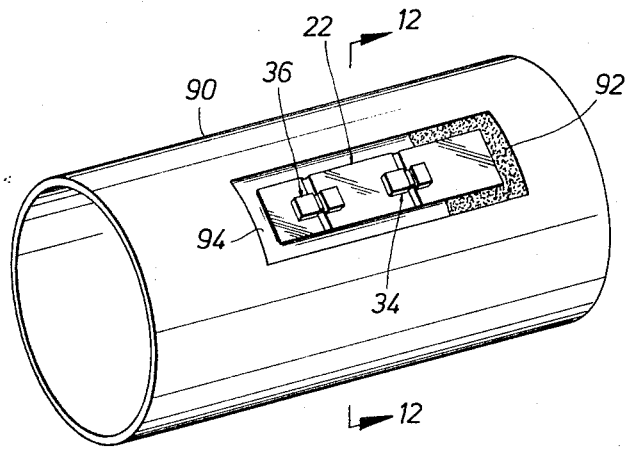
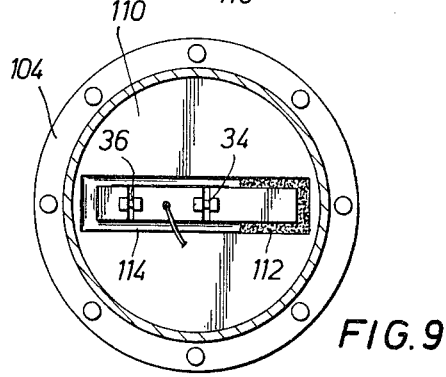
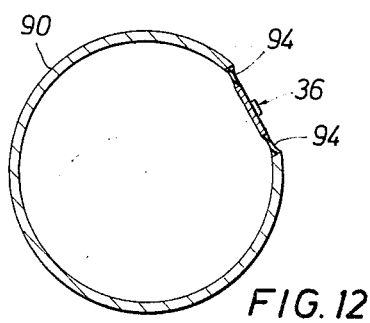
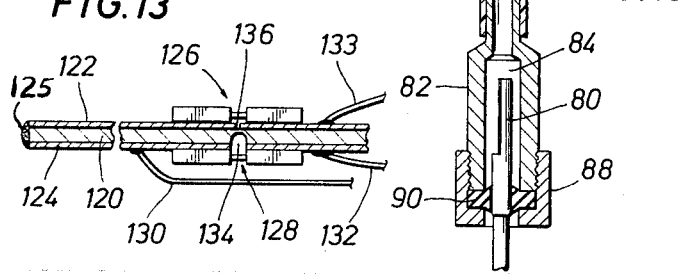
Huntly D. Millar
INVENTOR
BY
Arnold, White & Durkee
ATTORNEYS

PHYSIOLOGICAL PRESSURE TRANSDUCERS

BACKGROUND OF THE INVENTION

This invention relates to pressure transducers and methods of measuring fluid pressure and in particular relates to miniature transducers for making physiological measurements such as blood pressure measurements.

The present invention has particular application in making physiological pressure measurements, and the invention will be particularly described with reference to that field. However, it should be understood that there are many fields of application in which the basic principles of the invention can be employed.

The state-of-the-art method for measuring fluid pressures involves the use of a diaphragm to translate fluid pressure as a force per unit area into a force which is applied directly to sensing element. Most commonly, the diaphragm comprises a piston which is connected by a flexible member to a housing. Fluid pressure acting upon the piston causes a movement of the piston which is translated through a connecting rod to a sensing element such as a strain gage or other measurement device.

An advanced state-of-the-art is typified by the device disclosed in U.S. Pat. No. 3,490,441 to Gerald R. Curtis. The device disclosed by Curtis is an implantable blood pressure transducer that employs strain gages deposited on a bending beam to sense the movement of a metal sheath. The blood pressure acts directly upon the metal sheath which in turn translates a force to the bending beam. The strain gages deposited on the beam sense the deformation of the beam to provide a reading proportional to blood pressure.

SUMMARY OF THE INVENTION

The discovery upon which the present invention is based is that a separate diaphragm or exterior fluid barrier is unnecessary to be used in a pressure transducer. An elongated member such as a cantilever beam may be exposed as a diaphragm directly to a source of fluid pressure to create flexure thereof with an increase of at least ten times the output compared to conventional blood pressure transducers.

This discovery permits the energy of the fluid pressure to be used to bend a flexible beam carrying a strain gage, rather than to move a relatively rigid fluid barrier which in turn must bend a flexible member. Since a flexible member requires a minimum of force to deform it, most of the energy of the fluid pressure can be used to actuate the strain gage sensors.

The invention may be embodied in various forms including an implantable transducer housed in a catheter tip or probe for intra-arterial and intra-venous blood pressure measurements and generation of blood pressure recordings. The pressure transducer and catheter tip can be constructed small enough so that it can be inserted into an artery through the skin of an animal or human and pressed through the artery directly into the heart. Such a transducer is particularly suited for blood pressure measurements during cardiovascular surgery.

In other embodiments of the invention, pressure transducers may be used for measuring differential pressure of two fluid sources and for measuring the pressure flowing through a conduit or tube.

BRIEF DESCRIPTION OF THE DRAWINGS

Specific embodiments of the invention will now be described by way of example with reference to the accompanying drawings in which:

FIG. 6 is the same view as FIG. 5 except with pressure acting upon the cantilever beam to deflect it;

FIG. 7 is a circuit diagram of a Wheatstone bridge circuit for obtaining an electrical reading from the strain gage attached to the cantilever beam;

FIG. 8 is a cross-sectional view of the invention embodied in a differential pressure transducer;

FIG. 9 is a sectional view taken along lines 9—9 of FIG. 8;

FIG. 10 is a side elevation, partly in section, of an embodiment of the invention for using the catheter tip embodiment to measure fluid pressure at a point remote from the source of the pressure;

FIG. 11 is a perspective view of still another embodiment of the invention in measuring fluid pressure flowing in a conduit;

FIG. 12 is a sectional view taken along line 12—12 in FIG. 11; and

FIG. 13 is a side elevation of a modified beam element with dual strain-gage sensors.

DESCRIPTION OF SPECIFIC EMBODIMENTS

Figure 3:
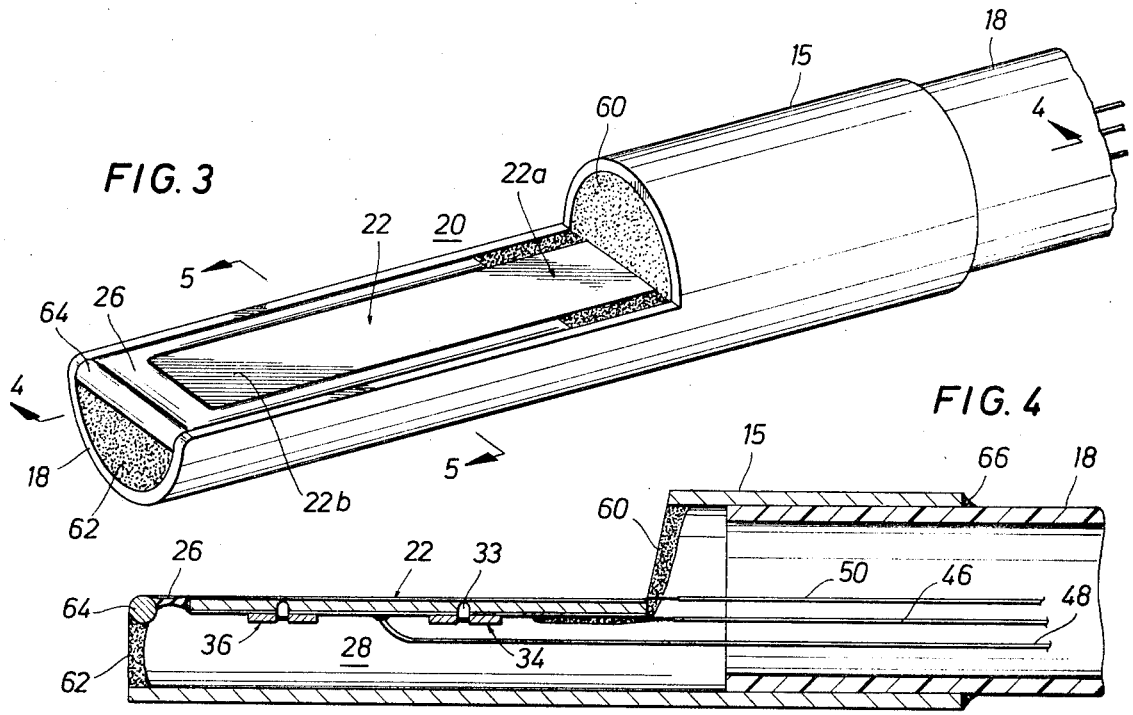
FIG. 3 is a perspective view of an embodiment of the invention in a pressure transducer located in a catheter tip.
Figure 4:
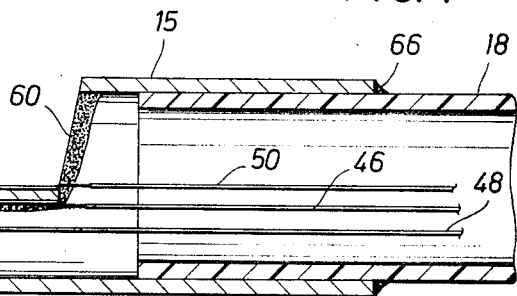
FIG. 4 is a sectional view taken along line 4—4 in FIG. 3.
Figure 5:
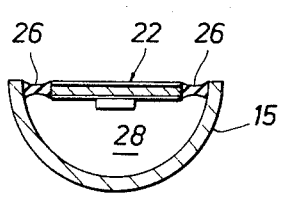
FIG. 5 is a sectional view taken along line 5—5 in FIG. 3.

Referring to FIGS. 3–5, there is shown an embodiment of the invention in an implantable catheter-tip transducer. The drawings, of course, illustrate the actual transducer in much enlarged size. The catheter-tip transducer comprises a generally tubular element 15 which serves as the rigid probe and to which is attached a flexible cable 18. The tubular element 15 has a flattened side 20 in which is removed a section of the wall structure encompassing the tip 22. On the flattened side 20 is located an elongated, flexible member 22 which is secured at one end 22a to the tubular element 15. The other end of the elongated member 22 at 22b is free to flex in response to applied fluid pressure. An elastic material 26 such as silicone rubber surrounds the gap between the walls of the tubular element 15 and the elongated member 22 to provide a sealed fluid barrier or pressure bulkhead and a sealed compartment 28 inside the catheter tip. The compartment 28 formed inside the catheter tip communicates with the ambient atmospheric pressure through the passageway provided inside the flexible cable 18. Thus the atmospheric pressure provides a source of reference fluid pressure against which is compared the fluid pressure applied to the exterior side of the elongated member 22.

As shown most clearly in FIG. 6, the application of fluid pressure in the direction of the illustrated arrows causes flexure of the elongated member 22. In the particular embodiment illustrated, the elongated member 22 includes a transverse notch 33, across which is affixed a strain gage 34. Since the elongated member is affixed at end 22a and is unsupported by any rigid connection at the opposite end 22b, it acts as a cantilever and performs according to the principles of stress analysis. Flexure of the elongated member 22 results in deformation along its longitudinal axis. This deformation is exaggerated within the transverse notch 33. Inward movement of the lever arm between the tip at end 22a and the transverse notch 33 causes compression of the strain gage element 34. The strain gage 34 is connected by electrodes to the wires carried inside the flexible cable 18 to a suitable measuring circuit where the impedance of the strain gage 34 may be measured, monitored, displayed or recorded.

Figure 1:
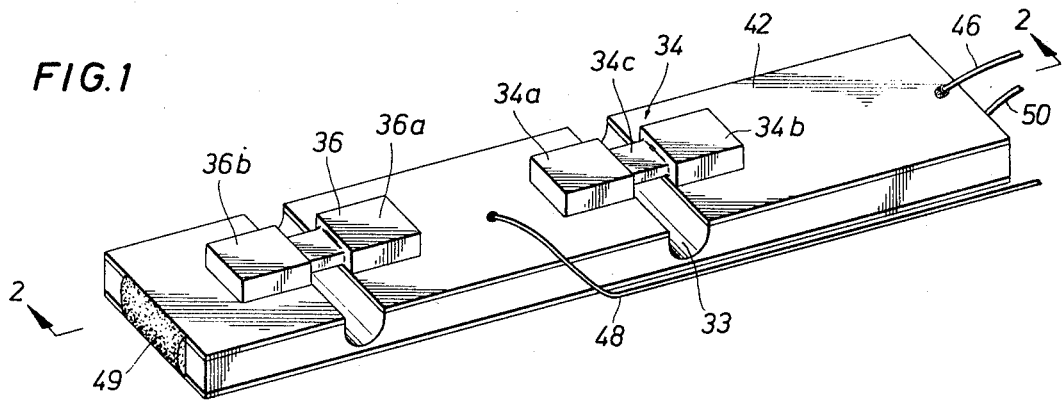
FIG. 1 is a perspective view of one embodiment of the cantilever beam for use in the invention.
Figure 2:
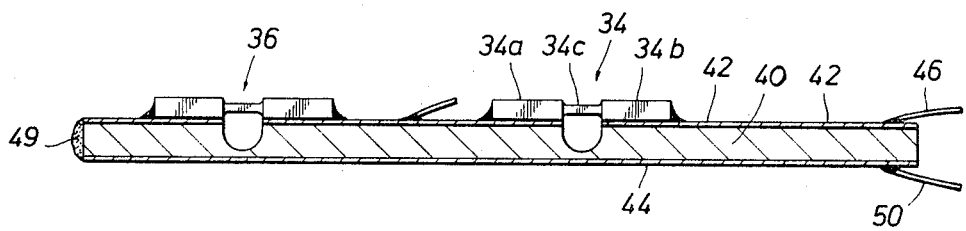
FIG. 2 is a sectional view taken along line 2—2 in FIG. 1.

In FIGS. 1 and 2 are shown an enlarged view of one specific type of an elongated member in the form of an laminated beam 40.

The beam as illustrated in FIGS. 1 and 2 includes a measuring strain gage 34 and a temperature compensating element 36. The beam 40 may be constructed of a ceramic material such as alumina which is clad on its upper and lower surfaces by a coating of precious metal 42 and 44. Strain gage 34 includes a pair of end blocks 34a and 34b which are joined by a neck 34c of reduced diameter. Each of the end blocks 34a and 34b are affixed to the beam 40 as by cementing or soldering. As the beam 40 is placed under load conditions to cause flexure, the gap across the notch 33 varies in dimension in the neck 34c. Compression and tension in strain gage 34 result in changes in its impedance which are sensed by the external sensing circuit. An electrode is provided by the connection of a wire 46 to the conductor surface 42, thus providing an electrical connection to the end block 34b for one side of the strain gage 34. A common electrode is provided by the wire 48 which is connected as by soldering or welding to the conductor surface between the end block 34a and the end block 36a of the temperature compensating element 36. The other side of the temperature compensating element provided by the end block 36b is connected through the upper coating and a conductive material 49, providing an electrical connection at the end of the beam element between the upper conductive surface 42 and the lower conductive surface 44. An electrode wire 50 is connected as by soldering or welding to the lower conductive surface 44 to provide electrical connection with the end block 36b.

Other means, of course, may be employed to measure the deformation of the elongated member 22. For example, wire filament strain gages may be deposited on one surface of this member.

The resistance of the strain gage 34 may be measured in any suitable measuring or monitoring circuit, one such circuit being illustrated in FIG. 7 as a conventional Wheatstone bridge. The resistance 34' and 36' represent respectively the resistances of strain gage 34 and temperature compensating element 36. Resistances 54 and 55 are adjusted to temperature compensate the bridge, and resistances 50 and 51 are adjusted to balance the bridge. A source of electrical excitation such as a DC potential source 56 is provided across the Wheatstone bridge. A measuring device such as a meter 58 is provided in connection across the other arm of the Wheatstone bridge. When the elongated member 22 is under no load conditions, the Wheatstone bridge is in balance and the electrical current passing through the meter 58 is zero. However, when a load is applied to the elongated member 22 by the application of fluid pressure, a change in the resistance of the strain gage 34 is caused which in turn causes a change in the resistance 34' and results in a flow of electrical current through the meter 58. The flow of current through meter 58 is directly proportional to the amount of fluid pressure to cause flexure of the elongated member 22.

The Wheatstone bridge circuit described above is of the direct current type, but of course, it is possible and often suitable to use alternating current electrical excitation. Also, a visual waveform readout may be provided by substituting an oscilloscope across the arms of the Wheatstone bridge in place of the meter 58. Also a strip chart may be provided by connecting the measuring arms across the Wheatstone bridge to its input and running strip chart as a function of elapsed time.

Turning now to the details of the mechanical construction of the catheter tip shown in FIGS. 3–6, the tubular housing may be composed of any rigid material such as metal, but for medical uses preferably stainless steel. In the manufacture of the catheter tip, the tubular element 15 is first subjected to a step of removing the section in the region 20 lying above the central axis of the tube and along a cutting plane passing parallel to the central axis. The elongated member 22 is inserted in the mouth of the pressure bulkhead zone and is affixed to the tubular element 15 by a cement 60 such as epoxy. The surrounding region is filled with an elastic material 26 such as silicone rubber. Thus the elongated member 22 is free to flex under load conditions provided by the application of external fluid pressure. The elastic material 26 stretches without materially inhibiting the flexure of the elongated member 22 under load.

In the embodiment illustrated, the end of the catheter tip is sealed with epoxy material 62 and a rod 64 is fixed across the end of the tubular element 15 and held in place by adhesion with the epoxy material 62.

The flexible cable 18 is inserted in the shank of the tubular element 15 and is held in place by epoxy material 66 concentrically surrounding the flexible cable 18 and being in contact with the end of the tubular element 15.

The catheter tip transducer just described in connection with FIGS. 3–6 can be constructed with a significantly larger voltage output than any other transducer currently available on the market. Sensitivity in an actual embodiment has been tested on the order of one millivolt per centimeter of mercury per volt of bridge excitation. The state-of-the-art strain gages utilizing wire strain gage elements have an output of only 50 microvolts per centimeter of mercury per volt of excitation. Because of the higher signal output in catheter tip transducers embodying the present invention, shielding is normally not required, and much less electronic amplification is required prior to processing the signals. Therefore, the catheter tip transducer embodying the present invention can be made with extremely flexible, unshielded cable leads without undue electrical influence affecting the output. In short, the signal-to-noise ratio in physiological transducers is significantly improved by use of the present invention.

The design according to the invention as described above has many advantages from a practical standpoint. Transducers embodying the design are relatively easy to manufacture and because they can use silicon strain gages which are already mounted in a well developed mass production low cost technique. Many of the manufacturers of transducers in order to provide for miniaturization must attach the silicon strain gage elements to deflecting membranes. Because the present invention eliminates the use of membranes or diaphragms, the expense and tediousness of attachment of silicon elements to membranes is obviated.

The catheter tip transducer as illustrated and described in connection with FIGS. 3–6 lends itself to many applications besides intra-arterial and intra-venous measurements. It may, for example, be inserted inside of a separate dome as illustrated in FIG. 10. A catheter tip transducer element 80 is shown inside of a pressure dome 82 defining a pressure chamber. The pressure chamber 84 communicates with a source of fluid pressure carried by the tubing 86. The pressure dome 82 includes exterior threads on to which fit a cap 88. A sealing ring 90 is mounted inside the cap 88 and adjacent the end of pressure dome 82. By tightening of the cap 88 on the threads, the sealing ring 90 is made to compress upon the sides of the catheter tip 80 and create a pressure seal inside the pressure chamber 84. The tube 86 may be connected to a source of fluid pressure to be measured such as blood pressure and the fluid pressure will actuate the beam element inside the catheter tip 80. Thus as shown in connection with FIG. 10, the catheter tip transducer embodying the present invention can have wide application not only for at-the-source measurement, but also for measurement of fluid pressure remotely from the source of generation by use of a fluid column transmitting the pressure pulsations to a pressure chamber.

Other embodiments of the invention may employ different types of housings for supporting that flexible member to which the pressure of fluid is to be subjected. In general, any type of housing may be employed defining an opening in which the flexible member is mounted. The housing must contain provisions for measuring the deformation of the elongated member under load and at least pair of electrodes in electrical connection with the means for measurement. An elastic material provides the seal between the gap of the housing and the elongated member to create a pressure bulkhead. The housing must be adapted for a source of reference fluid pressure to be applied on one side of the bulkhead against the elongated member and further adapted for a source of fluid pressure to be measured to be applied against the flexible member on the other side of the bulkhead.

In FIGS. 11 and 12 is illustrated still another embodiment of the present invention. Illustrated in FIGS. 11 and 12 is a conduit-type of pressure transducer for measuring the pressure of fluid flowing through a tube or conduit 90. Milled in the wall structure of the tube 90 is a slot in which is mounted an elongated member 22 which may be of the same type of construction as described above. The elongated member 22 is fixed at one end to the tube 90 by means of an epoxy material 92. The other end of the elongated member 22 is free to flex in response to applied fluid pressure. An elastic material 94 surrounds the elongated member 22 in the slot and provides a seal to create a pressure bulkhead. In response to variations in fluid pressure inside the bore of tube 90, the elongated member flexes to create deformation in the strain gage 34, and thus changes its electrical characteristics which can be measured as described above.

The sealing material 94 may be of silicone rubber as described above in connection with the other embodiments. The conduit 90 is preferably constructed of stainless steel. In specific applications, the Wheatstone bridge circuit may be mounted and fixed directly on the tube 90 with an encapsulating tube or cover surrounding it for protection.

In FIGS. 8 and 9 are illustrated a differential pressure transducer embodying the principles of this invention. A pressure housing 100 is divided into two halves, 100a and 100b, which are joined by bolts 102 connected through a circumferential flange 104. The pressure housing 100 is divided into compartments separated by a pressure bulkhead created by a disc 110 fixed between the flange 104. Located in a milled slot in the disc 110 is a beam element similar to the one described above in connection with the previous embodiment. The beam element is fixed at one end by suitable means such as an epoxy cement 112 and is free to flex at its other end. An elastic material such as silicone rubber 114 provides a seal around the gap between the beam element and the disc 110. The beam element carries strain gages 34 and a temperature compensating element 36 similar to the ones described above in connection with the other embodiments. Flexure of the beam element results in compression or tension in the strain gage 34 which may be measured in terms of changes in its electrical characteristics. A first source of fluid pressure is applied to the upper pressure chamber through a bore 116, and a second source of fluid pressure is provided to the lower pressure chamber through a bore 118. The result in differential pressure between the two applied pressures will cause the beam element to flex toward one pressure compartment or the other. The resultant change in electrical characteristics of the strain gage 34 will serve as a direct measure of the difference in pressure.

In FIG. 13 is illustrated a modification of the cantilever beam element employing dual strain gage sensors as active elements. Designated by the numeral 120 is the beam which can be mounted as described above in connection with other embodiments of the invention. The beam 120 is clad respectively on its upper and lower surfaces with a coating 122 and 124 of conductive material. A conductive material 125 is affixed to the end beam 120 to provide a conductive path between upper and lower conductive coatings 122 and 124.

A first strain-sensitive element 128 is affixed to the lower surface of the beam 120, bridging transverse notch 134 therein. On the upper surface of the beam 120 is affixed a second strain-sensitive element 126. Element 126 is secured opposite to element 128 and opposite to the notch 134. Each of the elements 126 and 128 thus has the same lever arm distance to the tip of beam 120. When beam 120 is placed under load by the application of fluid pressure, one of elements 126 and 134 is placed in tension and the other in compression.

The combined effect of elements 126 and 128 can be used to double the effective sensitivity of a pressure transducer. The output across element 126 is provided by a wire 133 secured at an electrode point to the upper conductive coating 122 and a wire 130 secured at an electrode point to the lower conductive coating 124. The output of element 128 is provided by wire 132 secured at an electrode point to the lower conductive coating 124 on one side of the gap. Wire 130 serves as a common electrode for both elements. A break 136 is provided in the upper conductive coating 122 to provide for changes in impedance of element 126 across the pivot point of notch 134.

Elements 126 and 128 may be connected in push-pull opposition in any suitable measuring circuit. For example, they may be connected in a Wheatstone bridge circuit as shown in FIG. 7 in the same manner as elements 34 and 36 described in connection with FIGS. 3–6. Each of elements 126 and 128 provides for temperature compensation of the other.

In the embodiments of the invention described above, the deformation of a flexible member is measured by a separate element affixed thereto. It is possible to use in certain embodiments of the invention, a flexible member such as a cantilever beam fabricated of a piezoelectric material. Flexure of this type of member would create an electrical potential which can be measured in a suitable circuit.

Certain embodiments and modifications of the invention having been described, it will now be apparent that there are still further embodiments and modifications which can be conceived within the true spirit and scope of the invention. It is intended to cover all such embodiments and modifications as fall within the scope of the appended claims.

What is claimed as new and desired to be secured by Letters Patent is:

1. A pressure transducer comprising:
   a housing defining an opening;
   a diaphragm formed by an elongated member mounted in the opening in the housing;
   the elongated member being free to flex in response to fluid pressure applied to the surface of the elongated member;
   means for measuring deformation of the elongated member;
   a pair of electrodes in electrical connection with the means for measuring deformation of the elongated member; and
   an elastic material sealing the gap between the housing and the elongated member to create a seal for the diaphragm, the housing being adapted for a source of reference fluid pressure to be applied on one side of the diaphragm against the elongated member, the housing being further adapted for a source of fluid pressure to be measured to be applied against the elongated member on the other side of the diaphragm.

2. A pressure transducer as defined in claim 1 wherein:
   one end of the elongated member is rigidly affixed to the housing and the other end of the elongated member is free to flex in response to applied fluid pressure.

3. A pressure transducer as defined in claim 1 wherein the elongated member comprises a rectangular beam mounted as a cantilever.

4. A pressure transducer as defined in claim 1 wherein:
   the elongated member includes a transverse notch; and
   the means for measuring deformation comprises a strain-sensitive element affixed to the elongated member bridging the notch.

5. A pressure transducer as defined in claim 1 wherein:
   the means for measuring the elongated member comprises a first element secured to one major surface of the elongated element and a second element secured to the opposite position on an opposite major surface of the elongated member.

6. A pressure transducer as defined in claim 1 further comprising a temperature compensating element affixed to the elongated member.

7. A physiological pressure transducer comprising:
   a catheter tip including a tubular wall having a tip end and a shank end, a section of the tubular wall being removed;
   a diaphragm formed by an elongated member mounted in the catheter tip below the section of the tubular wall which is removed and being free to flex in response to fluid pressure applied to the surface of the elongated member;
   means in the catheter tip for measuring the deformation of the elongated member;
   an elastic material sealing the gap between the catheter tip and the elongated member to create a seal for the diaphragm;
   a flexible cable secured to the shank end of the catheter tip, the flexible cable providing a fluid passage from a source of reference pressure to one side of the diaphragm within the catheter tip; and
   a pair of conductors within the flexible cable, the conductors being electrically insulated from each other and being in electrical connection with the means for measuring the deformation of the elongated member.

8. A physiological pressure transducer as defined in claim 7 wherein:
   one end of the elongated member is rigidly affixed to the shank of the catheter tip and the other end of the elongated member is free to flex in response to fluid pressure applied to the elongated member.

9. A physiological pressure transducer as defined in claim 7 wherein the elongated member comprises a rectangular beam.

10. A physiological pressure transducer as defined in claim 7 wherein:
    the elongated member includes a transverse notch; and
    the means for measuring deformation of the elongated member comprises a strain-sensitive element affixed to the elongated member bridging the notch.

11. A physiological pressure transducer as defined in claim 7 wherein the section of the tubular wall being removed from the catheter tip extends to and includes the tip end.

12. A physiological pressure transducer as defined in claim 7 further comprising a temperature compensating element affixed to the elongated member.

13. A physiological pressure transducer as defined in claim 7 wherein the means for measuring deformation of the elongated member comprises:
a first element secured to one major surface of the elongated element and a second element secured to the opposite position on an opposite major surface of the elongated member.

14. An implantable blood pressure transducer comprising:
a catheter tip of dimensions permitting receipt in an artery, the catheter tip including a hollow tube closed at one end to form the tip end and a flattened side, an opening being formed in the hollow tube in the flattened side;
a rectangular beam being mounted in the opening on the flattened side, one end of the beam being affixed to the hollow tube at the end opposite the tip end, the other end of the beam being free to flex in response to fluid pressure, the beam having a transverse notch spaced from the end of the beam which is free to flex;
a strain gage affixed on the inward side of the beam bridging the notch;
an elastic material sealing the gap between the beam in the hollow tube to create a sealed compartment inside the catheter tip;
a flexible cable secured to the hollow tube opposite the tip end, the flexible cable providing an air passageway from the sealed compartment in the catheter tip to the ambient atmosphere;
a pair of electrical conductors within the flexible cable, the conductors being electrically insulated from each other and being respectively in electrical connection with points on the strain gage on opposite sides of the notch.

15. An implantable blood pressure transducer as defined in claim 14 further comprising a temperature compensating strain gage affixed on the inward side of the beam.

16. A pressure transducer comprising:
a conduit adapted to carry a fluid, the conduit having an opening in the wall structure thereof;
an elongated member mounted in the opening in the wall structure of the conduit, one end of the elongated member being rigidly affixed to the conduit, the other end of the elongated member being free to flex in response to the pressure difference between the inside and the outside of the conduit;
means for measuring the deformation of the elongated member;
electrodes in electrical connection with the means for measuring deformation; and
an elastic material sealing the gap between the housing and the elongated member to create a pressure bulkhead.

17. A pressure transducer as defined in claim 16 wherein the elongated member comprises a rectangular beam.

18. A pressure transducer as defined in claim 16 wherein the elongated member includes a transverse notch and wherein the means for measuring deformation of the elongated member comprises a strain-sensitive element affixed to the elongated member bridging the notch.

19. A pressure transducer as defined in claim 16 further comprising a temperature compensating element affixed to the elongated member.

20. A differential pressure transducer comprising:
a pressure housing having two compartments separated by a bulkhead, the pressure housing having fittings for connecting a first and second source of fluid pressure to be measured, the bulkhead having a passageway extending from one compartment to the other;
a diaphragm formed by an elongated member mounted in the passageway in the bulkhead and one end being rigidly affixed to the bulkhead, the other end of the elongated member being free to flex in response to the composite of fluid pressures applied against the surfaces of the elongated member from the respective compartments;
means for measuring the deformation of the elongated member;
a pair of electrodes in electrical connection with the means for measuring deformation of the elongated member; and
an elastic material sealing the gap between the elongated member and the walls of the passageway in the bulkhead to create a seal for the diaphragm.

21. A pressure transducer as defined in claim 20 wherein:
the elongated member comprises a rectangular beam.

22. A pressure transducer as defined in claim 20 wherein:
the elongated member includes a transverse notch; and
the means for measuring deformation comprises a strain-sensitive element affixed to the elongated member bridging the notch.

23. A pressure transducer as defined in claim 20 further comprising a temperature compensating element affixed to the elongated member.

* * * * *